Sept. 23, 1952     C. W. BREES     2,611,721

METHOD OF ADHERING FABRIC TO RUBBER

Filed June 14, 1949

Inventor
Clarence W. Brees
By Robert W. Furlong
Atty.

Patented Sept. 23, 1952

2,611,721

UNITED STATES PATENT OFFICE 2,611,721

METHOD OF ADHERING FABRIC TO RUBBER

Clarence W. Brees, Cuyahoga Falls, Ohio, assignor to The B. F. Goodrich Company, New York, N. Y., a corporation of New York Application June 14, 1949, Serial No. 99,127

9 Claims. (Cl. 154—8)

This invention relates to the adhesion of fabric to rubber and has particular reference to a method of adhering textile fabric to rubber hose.

It is an object of my invention to provide a method of adhering fabric to rubber.

It is also an object of my invention to provide a hose of a vulcanized rubber and fabric which has improved resistance to the frictional flow of the fabric portion along the rubbery portion.

A further object of my invention is to provide an article having a fabric layer adjacent a rubbery layer which has improved resistance to flexing.

Other objects of my invention will be apparent from the drawings and description which follow.

Articles comprising a vulcanized elastomeric material in contact with a fabric layer generally have a weak bond between the fabric layer and rubber layer due to the inherent nature of fabric to not adhere to vulcanized rubber. The poor adhesion of the fabric to the vulcanized rubber often causes a separation of these two layers upon flexing, and flow or movement of the fabric layer along the surface of the rubber layer, with attendant undesirable results.

I have discovered that by impregnating the fabric layer adjacent the interface of the fabric and rubber layers with an accelerator prior to vulcanizing the article a greater adhesion between the two layers results upon vulcanization.

The elastomeric material which comprises the rubber layer may be natural rubber which is essentially a rubbery polymer of isoprene, such as caoutchouc and the like, or a sulfur-vulcanizable synthetic rubber, such as the rubbery polymers of open-chain conjugated diolefins having from 4 to 8 carbon atoms exemplified by butadiene-1,3; 1,4-dimethyl butadiene-1,3; 2,3-dimethyl butadiene-1,3, and the like, or the copolymers of these and similar conjugated diolefins with each other or with copolymerizable monomeric materials containing a single ethylenic linkage such as acrylonitrile, styrene, methyl acrylate, ethyl acrylate, methyl methacrylate, ethyl methacrylate, isobutylene, 2-vinyl pyridine, or similar materials. Although either natural or synthetic rubber may be used in the rubber layer, natural rubber is preferable, since a natural rubber composition in general is more plastic, thereby allowing a greater portion of the layer to be impregnated into and interlocked with the adjacent fabric layer.

The fabric layer may be natural fibers such as cotton, wool, silk, and the like, or synthetic fibers, such as rayon, nylon, glass fibers, and the like, and may be either braided, knitted, or woven.

Any conventional accelerator for the vulcanization of rubber may be employed in this invention, such as 2-mercapto benzothiazole, diphenyl guanidine, tetraethyl thiuram disulfide, 2-mercapto thiazoline, di-N-pentamethylene thiuram tetrasulfide, the disulfides of mixed dialkyl mercapto thiazoles, etc. There is nothing critical about the amount of accelerator employed, however, and improved adhesion is obtained when the amount is varied over a wide range. The precise amount of an accelerator required in any individual case will depend, of course, upon the particular accelerator employed as well as upon the time and temperature of vulcanization. It is preferable, however, that from 0.1 to 2.5 per cent by weight (based on the solvent-free weight of the fabric) of an accelerator be impregnated into the fabric.

The accelerator may be impregnated into the fabric layer in various manners, such as by dissolving the accelerator in a solvent or solvents and applying such solution to the fabric, dusting the accelerator onto the fabric, etc. It is preferable, however, to dissolve the accelerator in an organic solvent and dip the fabric into this solution. After the accelertaor solution has been absorbed, the fabric is removed from the solution and the solvent allowed to evaporate from the fabric leaving a deposit of the accelerator on the fibers. It is not necessary, however, that all of the fabric be impregnated with the accelerator, but merely the fibers adjacent the rubber-fabric interface so as to provide a layer of accelerator at the interface. To obtain the most satisfactory results it is preferable to impregnate these fibers adjacent the rubbery layer with from 0.5 to 5.0 ounces of an accelerator per square yard of fabric.

The conventional method of manufacturing fabric-covered rubber hose involves covering a tube of a vulcanizable rubber with a fabric jacket, then passing steam, hot water, or the like into the tube to heat and vulcanize it and to press it against the jacket. Under these conditions, where the heat of vulcanization is supplied only to one face of the rubber layer remote from the fabric layer, my invention has been found to give exceptionally good results, the adhesion between the fabric and rubber being increased by 90 per cent.

In the following examples embodying my invention fire hose is used only as an illustration of my invention, and I do not intend to limit my invention to fire hose but contemplate its use in other articles having a fabric layer in contact with a vulcanized rubbery layer.

Example 1

Figure 1:
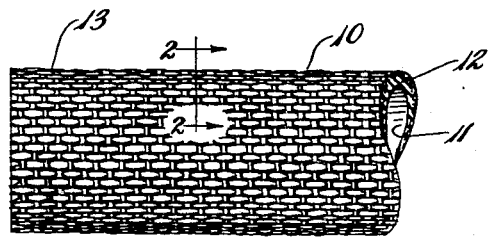
Fig. 1 is a fragmentary view in elevation of a fire hose embodying my invention.
Figure 2:
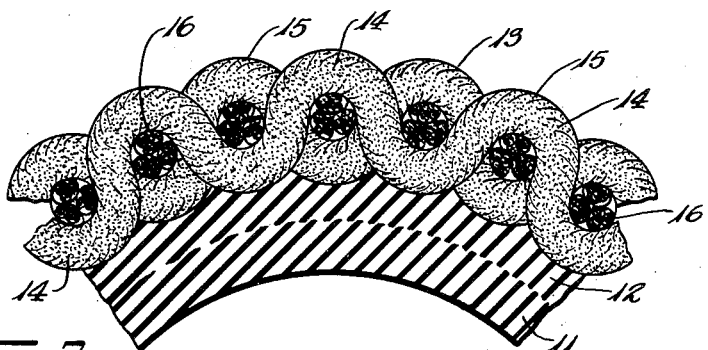
Fig. 2 is a view on line 2—2 of Fig. 1 showing one embodiment of this invention.

Fire hose 10, as shown in Fig. 1, generally consists of a calendered or extruded vulcanized rubber tube 11, a rubber backing layer 12, and a woven fabric jacket or jackets 13. The tube may be made of any natural or synthetic rubber composition, as pointed out above. The backing layer 12 is usually a compounded rubber stock which is relatively plastic, so that it will flow between the adjacent fibers of the fabric jacket 13 and form a weak bond betwen the two layers. The backing material, being the intermediate layer between tube 11 and jacket 13, must not only be of such a nature to flow into the fabric, but must upon vulcanization form a strong bond with tube 11.

A typical rubbery composition which may be used in the backing layer is as follows:

| Material | Parts by Weight |
| --- | --- |
| Natural rubber | 100.0 |
| Whiting | 50.0 |
| Zinc oxide | 6.0 |
| Sulfur | 3.5 |
| Softeners (soft coal tar) | 15.0 |
| Fatty acid (stearic acid) | 2.4 |
| Antioxidant (phenyl-beta-naphthylamine) | 1.7 |
| Accelerator (2-mercaptobenzothiazole) | 0.7 |
| Total | 179.3 |

The natural rubber is "broken down" on a mill and the fillers, softener, sulfur, etc. are added in the usual manner. The backing material is a relatively plastic material prior to vulcanization, and a layer of a desired thickness is readily formed about the tube which may be partially cured prior to this operation. Any of the vulcanizable synthetic rubbery materials such as rubbery conjugated diolefin polymers and copolymers may also be used, as pointed out above.

The fabric jacket material is dipped in a solvent solution comprising 10.0 grams of mercapto benzothiazole per 1 gallon of a 50:50 mixture of benzene and zylene and any other materials which are desired to be impregnated into the fibers of the jacket, such as water repellents, coloring matter, mildew inhibitors, etc., until from 0.1 to 2.5 per cent by weight (based on the solvent-free weight of the jacket) of the accelerator is absorbed by the fabric. The fabric is then removed from the solution and the solvent is allowed to evaporate from the jacket leaving rubber accelerator 14, 14 impregnated into and disposed over the surfaces of warps 15, 15 and woofs 16, 16 of jacket 13.

The treated dry fabric jacket is pulled over the tube and backing material and the hose is vulcanized by forcing steam into the inner chamber of the liner tube. Steam at 292° F. (approximately 45 lb. per sq. in. gauge pressure) maintained for a period of 20 minutes is satisfactory for proper vulcanization. This hose is vulcanized by forcing steam under pressure into the inner chamber of the tube, so that the pressure which the steam exerts against the tube and backing layer will force a part of the backing material into the adjacent layer of fabric, thereby increasing the bond between the backing and fabric layers.

Figure 3:
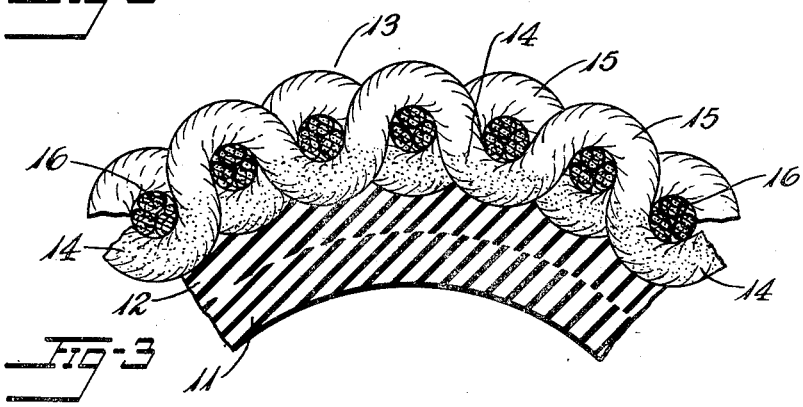
Fig. 3 is a view on line 2—2 of Fig. 1 showing another embodiment of this invention.

In another embodiment of my invention, as shown in Fig. 3, fabric jacket 13 has a rubber accelerator disposed over and impregnated into the faces of warps 15, 15 and woofs 16, 16 of jacket 13 only at the interface between jacket 13 and backing layer 12.

A fire hose prepared in this manner has an adhesion between the jacket and backing material of from 11 to 15 pounds per inch of width of fabric when tested as described in the A. S. T. M. dead weight adhesion test, which is an adhesion increase of about 90 per cent over a hose made in the same way except that the jacket has not been impregnated with an accelerator. This hose has increased wear resistance as compared to conventional types of fire hose and does not separate as readily at the fabric-rubber interface. Furthermore, due to the increased adhesion the fabric-rubber interface has improved resistance to flexing and to jacket flow along the backing layer due to friction when in use.

Example 2

A fire hose is prepared as in Example 1 except that the solvent solution into which the fabric jacket material is dipped comprises 4.0 grams of tetramethyl thiuram disulfide per gallon of carbon disulfide. The adhesion between jacket and backing material is comparable to that of Example 1.

Example 3

A fire hose is prepared as in Example 1 except that the solvent solution into which the fabric jacket material is dipped comprises 11.0 grams of a mixture consisting of 85 per cent bis (4,5-dimethyl thiazole) disulfide and 15 per cent bis (4-ethyl thiazole) disulfide per gallon of methyl ethyl ketone. The adhesion between jacket and backing material is similar to that obtained in the preceding examples.

I contemplate the use of my invention in all articles comprising a fabric layer in contact with a rubbery layer, such as fire hose, garden hose, mats, belts, tire plies, etc.

It is obvious that my invention is susceptible of numerous variations including substitution of equivalent materials and/or variations in the quantity of materials used without varying from the scope and spirit of my invention as defined in the appended claims.

I claim:

1. The method of making a composite article comprising impregnating at least the face of a fabric layer with an accelerator of vulcanization, assembling said fabric layer with said face in contact with a vulcanizable elastomeric composition comprising a vulcanizing agent and an accelerator of vulcanization, and vulcanizing said assembly.

2. The method of making a composite article comprising impregnating a fabric member with from 0.1 to 2.5 per cent by weight (based on the weight of the dry fabric layer) of an accelerator, assembling said fabric member in contact with a vulcanizable elastomeric composition comprising a vulcanizing agent and an accelerator of vulcanization, and vulcanizing said assembly.

3. The method of making a composite article comprising dipping a fabric member in a solution comprising an accelerator and an organic solvent, evaporating the said solvent from the said fabric member, assembling said fabric member in contact with a natural rubber composition comprising a vulcanizing agent and an accelerator of vulcanization, and vulcanizing said assembly.

4. The method of making a composite article comprising applying from 0.5 to 5.0 ounces of an accelerator per square yard to a face of a fabric member, assembling said fabric member with said face in contact with a vulcanizable elastomeric member comprising a vulcanizing agent and an accelerator of vulcanization, and vulcanizing the assembly.

5. The method of making a fabric-jacketed vulcanized elastomeric hose comprising impregnating at least a face of said fabric jacket with an accelerator, assembling said impregnated fabric jacket with said face in contact with a vulcanizable elastomeric tubular portion comprising a vulcanizing agent and an accelerator of vulcanization, and vulcanizing the assembly.

6. The method of making a fabric-jacketed vulcanized elastomeric hose comprising impregnating the said fabric jacket with from 0.1 to 2.5 per cent by weight (based on the weight of the dry fabric layer) of an accelerator, assembling the said fabric jacket in contact with a vulcanizable elastomeric tubular member comprising a vulcanizing agent and an accelerator of vulcanization, and vulcanizing the assembly.

7. The method of making a fabric-jacketed vulcanized elastomeric hose comprising impregnating the said fabric jacket with from 0.1 to 2.5 per cent by weight (based on the weight of the dry fabric layer) of an accelerator, assembling the said fabric jacket in contact with a vulcanizable elastomeric tubular member comprising a vulcanizing agent and an accelerator of vulcanization, and vulcanizing the assembly by forcing steam into the inner chamber of the tubular member.

8. The method of making a fabric-jacketed vulcanized elastomeric hose comprising impregnating the said fabric jacket with from 0.1 to 2.5 per cent by weight (based on the weight of the dry fabric layer) of an accelerator, assembling the said fabric jacket in contact with a vulcanizable elastomeric tubular member comprising a vulcanizing agent and an accelerator of vulcanization, and vulcanizing the assembly while the members of said assembly are pressed together.

9. The method of making a fabric-jacketed vulcanized elastomeric hose comprising applying from 0.5 to 5.0 ounces of an accelerator per square yard to at least one face of said fabric jacket, assembling said fabric jacket with said face in contact with a vulcanizable elastomeric tubular member comprising a vulcanizing agent and an accelerator of vulcanization, and vulcanizing the assembly.

CLARENCE W. BREES.

REFERENCES CITED

The following references are of record in the file of this patent:

UNITED STATES PATENTS

| Number | Name | Date |
|---|---|---|
| 1,349,911 | Pratt | Aug. 17, 1920 |
| 1,469,519 | Lister | Oct. 2, 1923 |
| 1,503,701 | Morton et al. | Aug. 5, 1924 |
| 1,913,327 | Barnes | June 6, 1933 |
| 2,129,626 | Riehl | Sept. 6, 1938 |
| 2,288,054 | Walton | June 30, 1942 |

FOREIGN PATENTS

| Number | Country | Date |
|---|---|---|
| 577,985 | Great Britain | June 11, 1946 |